United States Patent

Robin et al.

Patent Number: 6,137,877
Date of Patent: Oct. 24, 2000

[54] METHOD AND APPARATUS FOR ROUTING A DIALED TELEPHONE NUMBER

[76] Inventors: Bruce Robin, 2100 Bering Dr., #612, Houston, Tex. 77003; Jim Rautio, 5120 Woodway, #7009, Houston, Tex. 77056

[21] Appl. No.: 08/890,067

[22] Filed: Jul. 9, 1997

[51] Int. Cl.⁷ .................................................. H04M 15/00
[52] U.S. Cl. ........................... 379/352; 379/112; 379/113; 379/115; 379/221
[58] Field of Search .................................. 379/352, 354, 379/111, 112, 113, 114, 121, 210, 209, 125, 126, 219, 220, 221

[56] References Cited

U.S. PATENT DOCUMENTS

| | | | |
|---|---|---|---|
| 3,423,533 | 1/1969 | LaBarge | 379/148 |
| 3,499,117 | 3/1970 | Clark | 379/150 |
| 4,122,308 | 10/1978 | Weinberger et al. | 379/131 |
| 4,136,262 | 1/1979 | Clark, Jr. | 379/146 |
| 4,188,508 | 2/1980 | Rogers et al. | 379/189 |
| 4,198,545 | 4/1980 | Haist et al. | 379/132 |
| 4,209,668 | 6/1980 | Weinberger et al. | 379/188 |
| 4,232,200 | 11/1980 | Hestad et al. | 379/188 |
| 4,410,765 | 10/1983 | Hestad et al. | 379/112 |
| 4,565,903 | 1/1986 | Riley | 379/220 |
| 4,578,540 | 3/1986 | Borg et al. | 379/40 |
| 4,585,904 | 4/1986 | Mincone et al. | 379/67.1 |
| 4,685,127 | 8/1987 | Miller et al. | 379/221 |
| 4,741,029 | 4/1988 | Hase et al. | 379/359 |
| 4,751,728 | 6/1988 | Treat | 379/113 |
| 4,769,834 | 9/1988 | Billinger et al. | 379/112 |
| 4,825,463 | 4/1989 | Miura | 379/355 |
| 4,888,822 | 12/1989 | Weinberger et al. | 379/130 |
| 4,947,422 | 8/1990 | Smith et al. | 379/200 |
| 4,953,202 | 8/1990 | Newell | 379/200 |
| 4,964,159 | 10/1990 | Son | 379/356 |
| 5,054,059 | 10/1991 | Stern et al. | 379/200 |
| 5,200,995 | 4/1993 | Gaukel et al. | 379/200 |
| 5,241,589 | 8/1993 | Jefferson | 379/355 |
| 5,289,536 | 2/1994 | Hokari | 379/221 |
| 5,299,261 | 3/1994 | Bogart et al. | 379/354 |
| 5,305,372 | 4/1994 | Tomiyori | 379/59 |
| 5,311,585 | 5/1994 | Armstrong et al. | 379/221 |
| 5,341,415 | 8/1994 | Baran | 379/201 |
| 5,363,437 | 11/1994 | Shen et al. | 379/355 |
| 5,384,831 | 1/1995 | Creswell et al. | 379/67 |
| 5,400,395 | 3/1995 | Berenato | 379/114 |
| 5,402,481 | 3/1995 | Waldman | 379/355 |
| 5,420,914 | 5/1995 | Blumhardt | 379/114 |
| 5,425,084 | 6/1995 | Brinskele | 379/112 |
| 5,425,085 | 6/1995 | Weinberger et al. | 379/112 |
| 5,430,794 | 7/1995 | Ayame | 379/114 |
| 5,452,350 | 9/1995 | Reynolds et al. | 379/220 |

(List continued on next page.)

FOREIGN PATENT DOCUMENTS

WO97/11448  3/1997  WIPO ............................ G09G 5/00

Primary Examiner—Forester W. Isen
Assistant Examiner—Jacques M. Saint-Surin
Attorney, Agent, or Firm—Madan, Mossman & Sriram, P.C.

[57] ABSTRACT

A method and apparatus are provided for selectively routing a dialed telephone number. The apparatus intercepts a dialed telephone number having a plurality of digits and prevents the dialing of the number from being completed over the telephone access line. A comparator compares the digits of the dialed telephone number to a preselected combination of digits and also includes routing means for routing the dialed number along a first route if the compared digits are in agreement, but will route the dialed telephone number along a second route if the compared digits are not in agreement with the preselected combination.

13 Claims, 7 Drawing Sheets

U.S. PATENT DOCUMENTS

| | | | |
|---|---|---|---|
| 5,452,351 | 9/1995 | Yamamoto | 379/221 |
| 5,473,630 | 12/1995 | Penzias et al. | 375/114 |
| 5,473,677 | 12/1995 | D'Amato et al. | 379/112 |
| 5,475,743 | 12/1995 | Nixon et al. | 379/113 |
| 5,481,604 | 1/1996 | Minot | 379/221 |
| 5,515,425 | 5/1996 | Penzias et al. | 379/114 |
| 5,519,769 | 5/1996 | Weinberger et al. | 379/112 |
| 5,550,909 | 8/1996 | Chanda et al. | 379/220 |
| 5,550,915 | 8/1996 | Partridge, III | 379/355 |
| 5,553,124 | 9/1996 | Brinskele | 379/112 |
| 5,570,417 | 10/1996 | Byers | 379/115 |
| 5,572,073 | 11/1996 | Burgess et al. | 307/38 |
| 5,586,177 | 12/1996 | Farris et al. | 379/230 |
| 5,606,602 | 2/1997 | Johnson et al. | 379/115 |
| 5,621,662 | 4/1997 | Humphries et al. | 364/550 |
| 5,638,433 | 6/1997 | Bubien et al. | 379/130 |
| 5,644,633 | 7/1997 | Kaufeld et al. | 379/355 |
| 5,764,741 | 6/1998 | Barak | 379/114 |
| 5,799,072 | 8/1998 | Vulcan et al. | 379/114 |

METHOD AND APPARATUS FOR ROUTING A DIALED TELEPHONE NUMBER

BACKGROUND OF INVENTION

The present invention generally relates to a telephone system for facilitating dialing telephone numbers containing a large number of digits. More particularly, the present invention relates to a telephone dialing method and system which can be used between the telephone and the telephone access line for automatically inserting an alternate inter-exchange carrier for long distance and/or international telephone calls.

Since the breakup of the American Telephone and Telegraph Company, a plurality of local and long distance carriers have emerged. The consumer has an opportunity to choose a primary long distance telephone carrier. This means that whenever a long distance telephone call is made from a subscriber's telephone, the call is automatically routed to the selected primary long distance carrier.

The long distance telephone business is a highly profitable business, and such profits will increase generally as the number of subscribers utilizing the particular long distance carrier increases. There is fierce competition among the various long distance carriers in an attempt to obtain subscribers.

Because of such competition, different long distance carriers provide different telephone rates depending on the time of call, the area being called, and even the person being called. Therefore, it is possible that a subscriber may choose one primary long distance carrier for most telephone calls. However, for other telephone calls, the subscriber may prefer to utilize a different long distance carrier. As noted above, this might depend on the time, the duration or the location of the called party.

It is possible for a subscriber to change primary long distance carriers. However, this requires contacting the various carriers and making arrangements for such changes. Quite often, some fees are involved when such changes are made.

In addition to the number of long distance carriers that have been licensed to provide long distance telephone service, there are telephone wholesalers also available for different types of subscribers. The telephone wholesalers may purchase time in large blocks from one or more of the licensed long distance carriers. The wholesaler then resells the time to individual subscribers. Since the reseller can guarantee a large amount of usage of the long distance telephone service, the reseller can generally obtain much better telephone rates than an individual subscriber for making the long distance telephone calls. Thus, the reseller can then pass on some of the savings to individual subscribers.

In order to make use of the reseller's equipment, or to use a different long distance carrier from the primary carrier, it is necessary for the telephone caller to first dial an access code into the dialing string. The access code is generally in the form of "101-XXXX" or "10-XXX," but because the "101-XXXX" format appears to be more likely to be used and for purposes of simplicity, the following description will be provided in terms of the "101-XXXX" format, even though the present invention will accommodate any format of access code. This is also called the "Casual Calling" access code.

As is known, to generally dial a local telephone number, one must dial seven digits. If a long distance telephone call is being made, the subscriber must dial a "1" followed by the area code, followed by the seven digits in the dialing string. Furthermore, if an international call is being made, the subscriber must generally first dial "011" in order to set up the equipment for the international telephone call. The present invention makes use of these features for selectively routing dialed telephone calls.

SUMMARY OF THE INVENTION

It is accordingly an object of the present invention to provide a method and apparatus for permitting a telephone subscriber to automatically use different telephone transmission routes, depending on the type of call being made.

It is an object of the present invention to provide a device which is located between a subscriber's telephone and the subscriber's telephone access line. The device will intercept a dialed telephone number and compare at least one of the digits of the dialed telephone number to a preselected combination of digits. The system incorporating the principles of the present invention includes routing means for routing the dialed number along a first route if the compared digits are in agreement with the preselected combination and along a second or third route if the compared digits are not in agreement with the preselected combination.

The method incorporating the principles of the present invention includes the steps of selectively routing a dialed telephone number. These steps include intercepting a dialed telephone number before the number reaches the telephone access line. The intercepted number is compared to one or more digits of several preselected combinations of digits. If one or more of the digits of the compared digits are in agreement, an access code for an inter-exchange carrier will automatically be inserted before the dialed telephone number and then the number will be transmitted to the telephone access line. More than one access code can be stored and used, depending upon the results of the comparison.

A further feature of the apparatus incorporating the principles of the present invention is that the apparatus can be operated solely on the electrical power provided by the telephone access line.

Another feature of the present invention is that the telephone inter-exchange carrier company can dial a particular telephone subscriber, and when the subscribers answers, the "101-XXXX" access code and/or other data in the dialing device may be automatically reprogrammed.

Still another feature of the present invention is that a single telephone dialing device will permit all of the telephone instruments on a single telephone line to have the benefits of the present invention if the unit is placed at the network interface.

Another feature of the present invention is that the telephone dialing device can be bypassed by simply pressing a selected button on the telephone.

Further features of the system incorporating the principles of the present invention include a receiver and decoding means for intercepting a dialed telephone number from the telephone and developing a number having a plurality of digits corresponding to the dialed number. Comparing means are provided for receiving the developed number and comparing one or more of such digits to stored preselected combinations of digits while preventing the dialed number from reaching the telephone access line. Finally, transmitting means are provided for dialing at least one "101-XXXX" access code for an inter-exchange carrier followed by the dialed telephone number and transmitting the entire dialing string to the local telephone line when the compared digits are in agreement but transmitting only the dialed telephone number when the compared digits are not in agreement.

Further features of the present invention include using a dual tone multifrequency ("DTMF") receiver and decoder as the receiver and decoding means, a dial tone and busy tone detection circuit, a microprocessor as the comparing means and a dual tone multifrequency transmitter as the transmitting means.

An additional feature is the provision of a dual-mode dialing device which provides different functionality depending upon which mode the device is configured. A first set of functionalities may include the long-distance call re-routing operations described above or may include the provision of Internet-based long-distance dialing operations, and a second set of functionalities may include access to business service features (such as a remote voice mail platform) or a dialing platform for avoiding hotel call charges.

A still further feature of the present invention is that the dialing device can be configured to perform an initial registration and/or to periodically call back to a "home base" or control center to provide information about the activity or usage of the device.

In accordance with another embodiment of the present invention, a dual mode telephone dialing device apparatus and method is provided for insertion and operation between a telephone and a telephone access line for selectively routing a dialed telephone number, including a receiver for intercepting and decoding a dialed telephone number having a plurality of digits and a controller for comparing at least one of the digits of said intercepted number to at least one preselected sequence to generate a first dialing sequence if the device is configured in a first mode and to generate a second dialing sequence if the device is configured in a second mode, where the first dialing sequence consists of an access code and the dialed number if the compared digits are in agreement with a first preselected sequence; and wherein the second dialing sequence includes at least an external line digit (such as a "8" or "9" used in hotel phone systems) and a toll-free number access code if the compared digits are in agreement with a second preselected sequence.

These and other objects of the present invention will become apparent to those skilled in the art after reading the following detailed description of a preferred embodiment which is illustrated in the following drawings in which:

DETAILED DESCRIPTION

Figure 1:
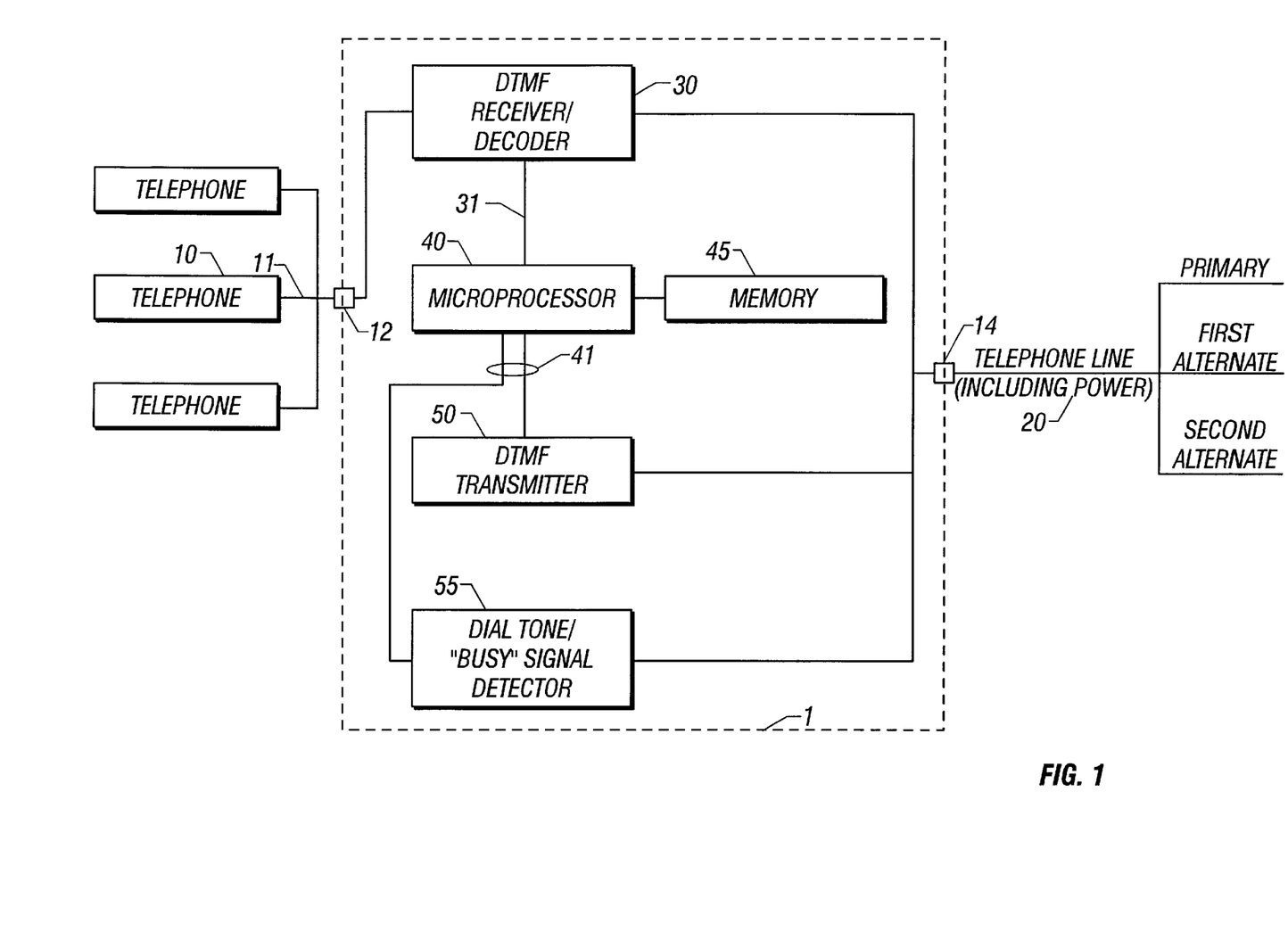
FIG. 1 is a block diagram showing an embodiment of the present invention.

Referring to the drawings, in FIG. 1, the telephone 10 generally has a handset which is removed for dialing a telephone number. It is recognized that some telephones are cordless telephones and there are also cellular telephones. Accordingly, as used in this application, a telephone goes "off-hook" when the telephone 10 is operated to receive a dial tone from a telephone access line 20.

Arranged between the telephone 10 and the telephone access line 20 is a dual tone multifrequency (DTMF) receiver and decoder 30 for receiving data or dialing sequences from the telephone and/or from the telephone access line; a microprocessor 40 or other suitable controller, and a DTMF transmitter 50. These elements are arranged and connected as a stand-alone unit adapted for insertion and operation between a telephone and a telephone access line for selectively routing a dialed telephone number. The unit is attached to the telephone through a first connector 12, and is connected to the telephone access line through a second connector 14, where the connectors may be of any suitable variety for making electrical signal connection possible, such as RJ11 jacks.

The dialed telephone number from the telephone 10 is applied to the DTMF receiver/decoder 30 via an electrical conductor 11. The DTMF receiver/decoder 30 will transform the received telephone number into a plurality of digits if the dialed telephone number is not already in digital form. The digital number, equivalent to the dialed telephone number from the telephone 10, is applied along an electrical conductor 31 to the microprocessor 40.

The microprocessor 40 will temporarily store the digital dialed telephone number in memory 45 and will compare the dialed telephone number in digital form to preselected sequences or stored combinations of digits. The operation of the microprocessor 40 will subsequently be described with respect to the flowcharts of FIGS. 2–7.

In a preferred embodiment, the present invention dials the dialed telephone number to the access line and, upon determining that the call is to be routed along an alternate route, prevents the call from being completed by flashing the telephone access line to obtain a dial tone prior to dialing a new dialing sequence. Alternatively, the stored dialed telephone number is prevented from reaching the telephone access line 20, and after being compared to the preselected combination of digits in the microprocessor 40, the telephone number is then applied via an electrical conductor 41 to the DTMF transmitter 50. The DTMF transmitter 50 will then transmit the number received from the microprocessor 40 in the form of a dialing string of numbers and will apply the same to the telephone line 20.

The dialed string of numbers will follow one of at least two routes. According to a selected embodiment of the present invention, the first route will be to an alternate inter-exchange carrier (IXC) for handling, for example, long-distance telephone calls in North America. Another route may also be provided through a second alternate IXC for handling international phone calls. In this arrangement, the microprocessor 40 will have inserted the access code "101-XXXX" before the dialed telephone number. Thus, the number that is applied to the telephone access line 20 from the DTMF transmitter 50 will then be automatically transmitted to the alternate inter-exchange carrier without being transmitted to the primary long distance carrier of the telephone subscriber. As will be appreciated, access to the primary carrier or to an alternate carrier will use the same outgoing telephone line, but will be determined in the switching of the call by the telephone network in response to the carrier code provided.

That is, the telephone 10 and the access line 20 will normally have a preselected primary long distance carrier. In the event the telephone subscriber chooses not to use the primary long distance telephone carrier, the subscriber will utilize the telephone dialing device illustrated in FIG. 1 and incorporating the principles of the present invention. The access code 101-XXXX will be inserted in the dialing string of numbers before the dialed telephone number to instruct the equipment on the telephone access line to send the number along the first route which includes the alternate inter-exchange carrier. This will occur, as will be explained with respect to the flowcharts of FIGS. 2–7, when the combination of digits or preselected sequences compared in the microprocessor 40 are in agreement.

In the event the digits compared in the microprocessor 40 do not agree, no access code number will be inserted into the dialing string and the number transmitted from the DTMF transmitter 50 will be the actual number dialed at the telephone 10. This will provide the second route for the dialed telephone number which is applied by the telephone access line to the local telephone exchange.

The DTMF receive/decoder 30, the microprocessor 40 and the DTMF transmitter 50 are all conventional telephone equipment readily available and their actual circuits need not be included at this time in order to avoid unnecessarily complicating the drawings.

Figure 2:
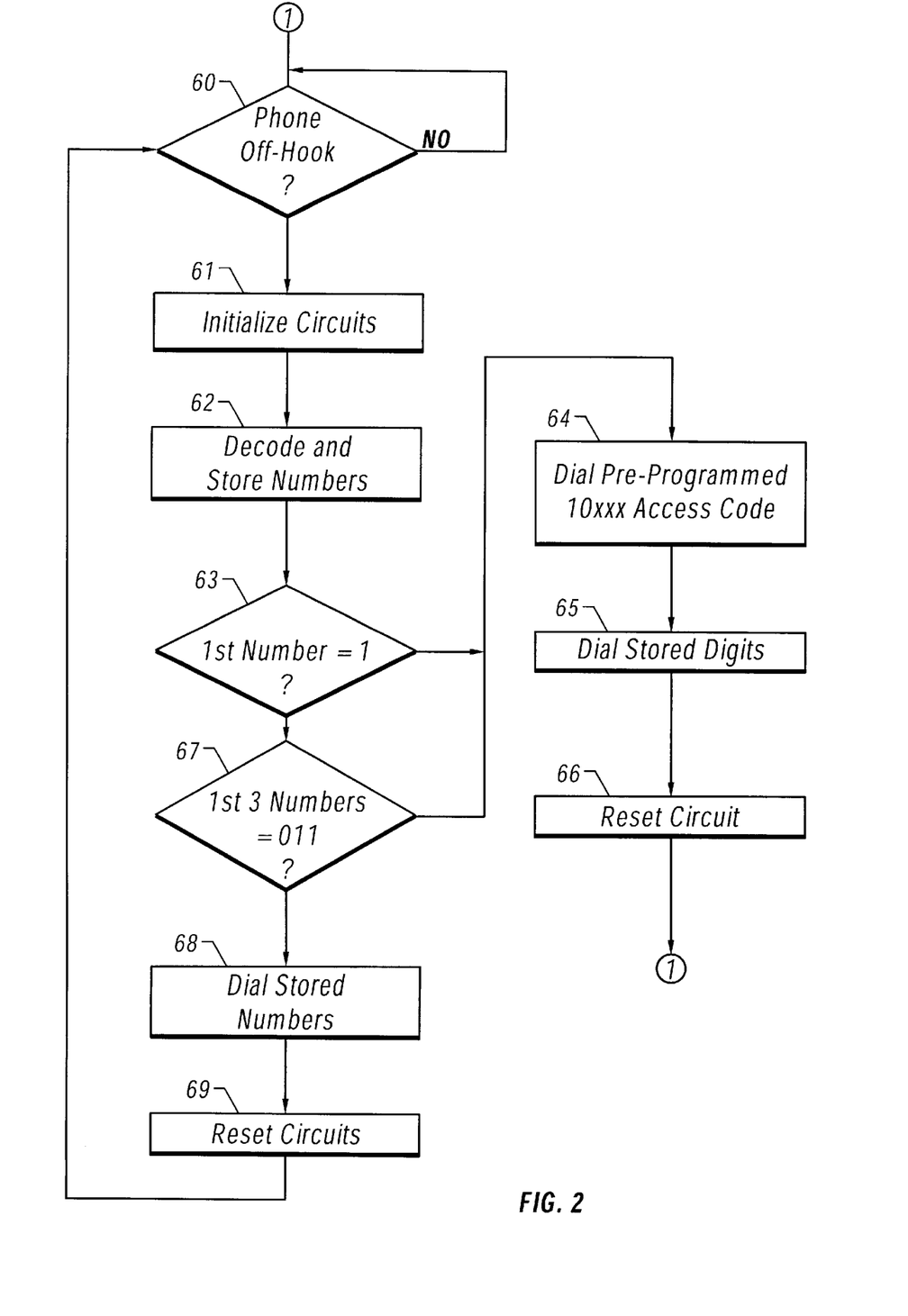
FIGS. 2–8 are flow diagrams showing the various steps practiced by the apparatus incorporating selected principles of the present invention.

Referring now to the flowchart of FIG. 2, in the first step, the telephone 10 goes into off-hook operation. This occurs when the handset is removed from the telephone, or otherwise connected to receive the dial tone from the telephone access line 20. When the phone goes off-hook as indicated by the box 60, the circuits 61 are initialized to receive the dialed telephone number. The dialed telephone number is then subjected to the decoding and storing step 62.

In the next step 63, the first number of the dialed number is compared to the stored preselected combination of digits in the microprocessor 40. If the first number of the dialed telephone number is a "1", this information is utilized to perform the next step 64. As stated previously, the dialing step 64 may include flashing the telephone access line to prevent the dialed number from being completed along the primary carrier so that the call can instead be routed along an alternate carrier unless the dialed number was originally buffered or otherwise prevented from reaching the telephone access line. Step 64 dials a pre-programmed access code 101-XXXX in front of the dialed stored telephone number. In the next step 65, the dialed stored telephone number is transmitted via the DTMF transmitter 50 to the telephone access line 20.

Since in this case the pre-programmed 101-XXXX access code has been inserted in front of the dialed telephone number, the telephone access line will send the number along a first route to the alternate inter-exchange carrier.

After transmitting the dialed string of numbers at the step 65, the dialing device will enter a "wait" state until the caller hangs up the phone, at which time step 66 resets the circuit and prepares it for the next dialed number.

In reviewing the above operation, it should be noted that when a telephone subscriber makes a long distance call, the first digit dialed is a "1", then the area code is dialed and the seven digit dialed number follows. It is known that the digit "1" is required to set up the long distance circuit. Accordingly, with this arrangement, once the system incorporating the principles of the present invention recognizes that a long distance number is to be transmitted, the system operates to automatically insert the stored alternate inter-exchange carrier access code in front of the dialed number prior to dialing the entire sequence.

Returning now to the flowchart of FIG. 2, in the event the first number of the dialed telephone number is not a "1", the next step is step 67, which now compares the first three numbers of the dialed number to a combination of digits (011) stored in the memory 45. In the event the first three digits of the dialed number equal 011, this indicates an international call is being made.

When the international call is to be placed, the agreement of the first three numbers of the dialed telephone number with the preselected stored combination of digits in the microprocessor 40 will again result in the step 64. Thus, the 101-XXXX access code which has been pre-programmed in the microprocessor 40 will be inserted before the dialed telephone number to alert the public telephone switching network (not shown) attached to the telephone access line 20 that an international call is to be placed. Alternatively, a toll free "1-800-XXX-XXXX" number may be retrieved from a memory location 45 corresponding to the matched combination of digits and used as an access code. The DTMF transmitter 50 will then dial out all of the stored digits (access code and dialed number) and transmit them to the telephone access line 20 at steps 64 and 65. The circuits will again be reset by the step 66.

Thus, it can be seen that the telephone dialing system incorporating the principles of the present invention can save the telephone subscriber substantial time. Once the telephone subscriber decides to use an alternate inter-exchange carrier and the telephone dialing device incorporating the principles of the present invention has been pre-programmed with the alternate inter-exchange carrier selected, the device will thereafter automatically insert the appropriate access code into any long distance or international call to be made.

This saves the necessity of the telephone subscriber remembering the access code whenever the alternate carrier is to be used. The telephone subscriber merely dials the long distance number in the same manner as usual and the telephone dialing device incorporating the principles of the present invention will automatically take care of routing the call to the appropriate inter-exchange carrier. As noted above, the telephone dialing device incorporating the principles of the present invention may have its preprogrammed access code changed automatically by the desired inter-exchange carrier. This is carried out by the carrier dialing the telephone subscriber having the device. When the call is answered, a secret code is transmitted from the carrier and the device is automatically set to the desired access code. This permits the carrier to change the selected code or other programmable information if needed.

Returning to the flow chart diagram of FIG. 2, if the three numbers compared in step 67 are not in agreement with the stored combination of digits in the microprocessor 40, the microprocessor 40 will then perform the step 68, which transmits along the electrical conductor 41 information to the DTMF transmitter 50 to transmit simply the dialed number that has been stored in or by the microprocessor 40 in applications where the dialed number was prevented from reaching the telephone access line in the first place. Alternatively, where the telephone number was transmitted in the first place to the access line, the dialing device simply lets the call proceed without flashing the access line. Thus, there will be no insertion of any access codes and the telephone access line 20 will send the dialed telephone number to the local telephone company exchange.

In other words, the failure of the comparison with the first three digits to agree with the preselected combination of digits stored in the microprocessor 40 (along with a failed comparison at step 63) will indicate that the call is a local telephone call and that no long distance carrier or international call need be placed.

At the end of the step 68, the circuits are again reset in the step 69 in a manner similar to that of step 66.

It can be seen that no separate electrical power connections are provided in the apparatus illustrated in FIG. 1. The telephone access line 20 generally brings to the subscriber and the telephone 10 electrical power for operating the telephone system in the usual manner. By having the telephone dialing device inserted between the telephone 10 and the telephone access line 20, the electrical power is available for powering the apparatus of the telephone dialing system which includes the DTMF receiver/decoder 30, the microprocessor 40, and the DTMF transmitter 50. Thus, no alternate power source is required. Of course, if such alternate power source is desired, it can readily be utilized.

Furthermore, many telephone subscribers have a plurality of telephones operating on a single telephone access line 20, as shown in FIG. 1. With the telephone dialing device incorporating the principles of the present invention, only a single device is needed for the access line 20. Any one of the telephones connected to the access line 20 may be used and still have the advantages of using the device provided it is installed between the access line and all such phones.

The present invention has been described to provide at least two separate routes for the dialed telephone number to follow. In the event an alternate inter-exchange carrier is to be used, the required access code is automatically inserted and the telephone subscriber need only dial the long distance number without concern as to the access code. The same is true with respect to making an international call utilizing the alternate inter-exchange carrier.

In the event a local telephone call is to be made or any other number on the exclusion list (described below) is dialed, the subscriber merely dials the local telephone number and the telephone dialing device will not interfere with such local dialed telephone number and will apply such number to the telephone access line 20 to follow the default route to the local telephone exchange. This operation is possible because the dialing device can quickly make its comparison determinations and stop the call from being completed if a match is found between a dialed long distance number and the stored sequence data.

Suppose the telephone subscriber would like to use the primary long distance carrier which has been previously chosen. In this event, the system will respond to the operation of one of the alternate buttons available on the telephone handset. These buttons are known as the "*" and "#" button. Either one of these buttons or a combination thereof can be utilized and operated prior to dialing the telephone number to automatically bypass the telephone dialing device incorporating the principles of the present invention, but a preferred embodiment uses the "*" button to bypass the call routing function.

Accordingly, the telephone subscriber has several choices. For a local dialed telephone number, the subscriber merely dials the telephone number. To use the primary long distance carrier, the telephone subscriber operates the "*" button to bypass the device. In the event the telephone subscriber wants to utilize the alternate inter-exchange carrier because the rates are better or for any other reason, the subscriber need merely dial the long distance or the international telephone calling dialed number. At this point, the telephone dialing system incorporating the principles of the present invention will automatically arrange for the alternate inter-exchange long distance carrier to be used.

As noted above, a further advantage of the system incorporating the principles of the present invention is that the telephone subscriber has the option of utilizing the primary long distance carrier or the alternate long distance carrier without having to correspond with either of the long distance carrier companies to arrange for an exchange of carriers and without having to dial any special access code before dialing the telephone number.

It is possible to have more than one alternate inter-exchange access code automatically inserted if the subscriber desires to use more than the primary long distance carrier and one alternate inter-exchange carrier. This will require that the microprocessor 40 or associated memory 45 be programmed with more than one access code, and that the microprocessor choose which alternate inter-exchange carrier is to be used prior to dialing the telephone number. Once this is selected, the proper access code will be inserted automatically without additional operation required by the telephone subscriber.

Figure 3A:
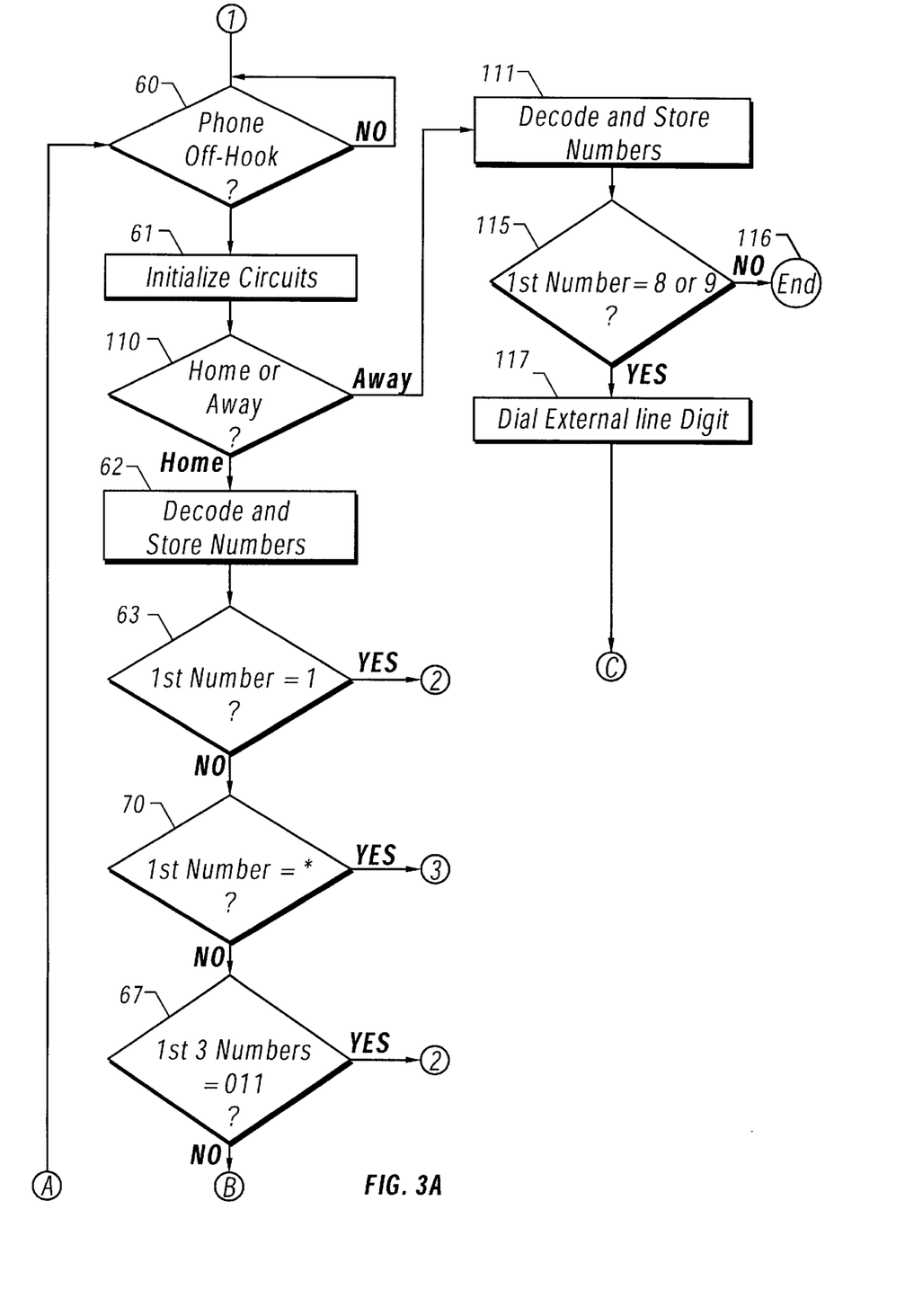
Figure 3B:
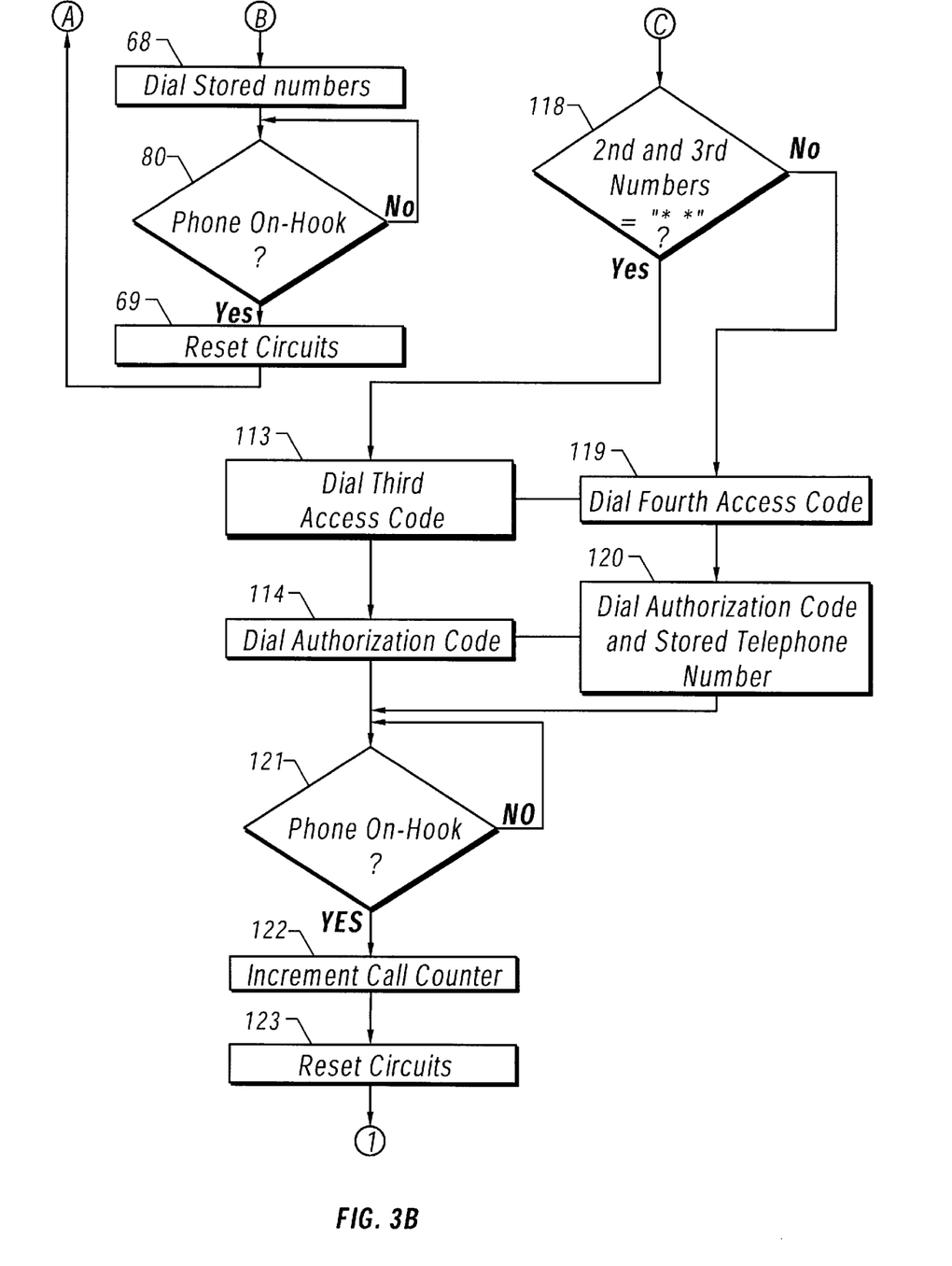

In accordance with an alternate embodiment of the present invention, the flow charts of FIGS. 3A and 3B depicts the operation of an alternate apparatus for routing a dialed telephone number. As with the flow chart of FIG. 2, corresponding steps are identified with the same reference numerals, and the system of the present invention is described in terms of determining whether a toll number has been entered by the user and providing specialized dialing functions (to be described below), but otherwise dialing the stored telephone number sequence in the normal fashion.

Figures 7, 8:
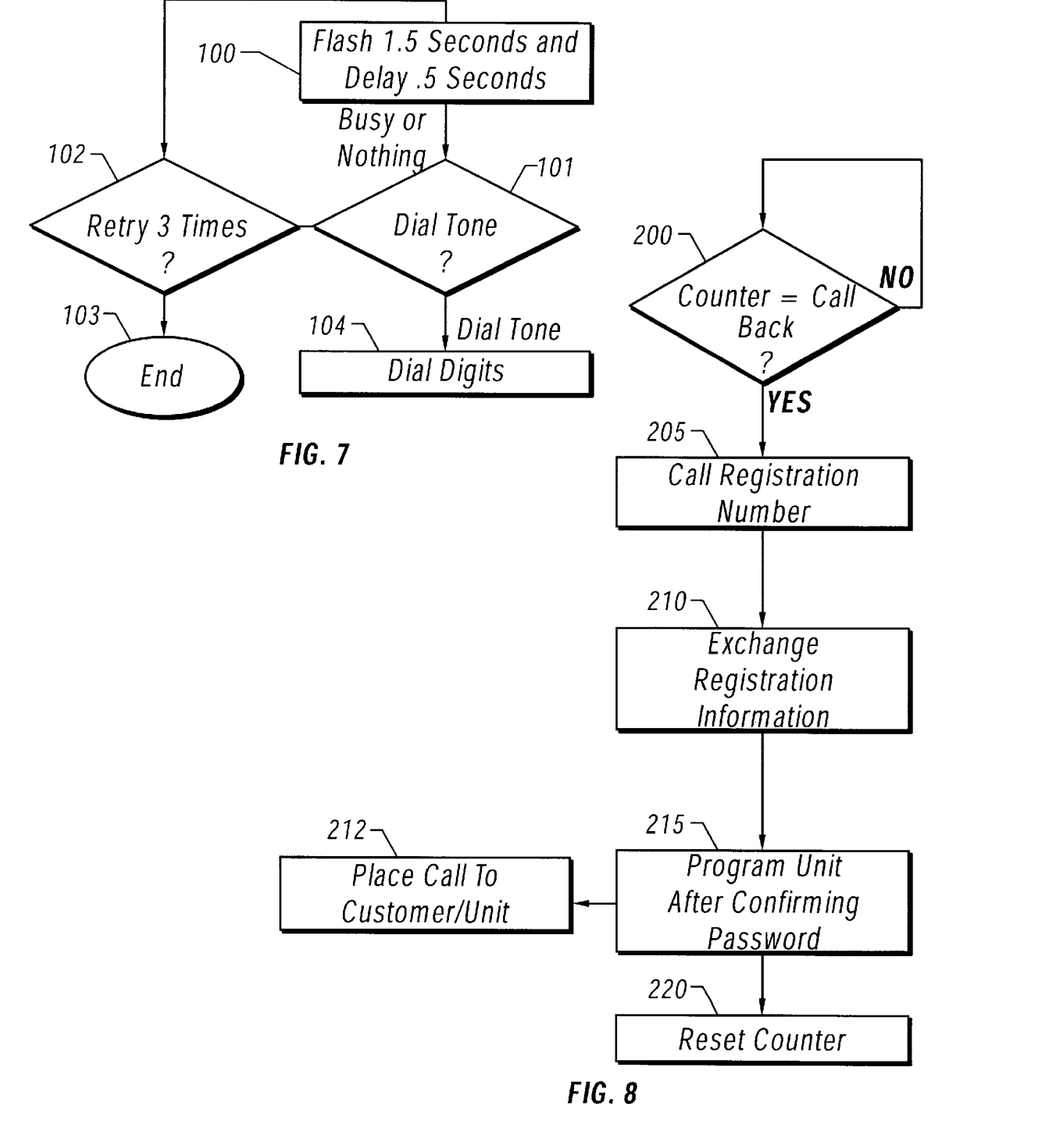

As a generalized statement about the present invention, at any point during the operation of the telephone dialing device that a number or number sequence is to be dialed, the stand-alone telephone dialing device of the present invention provides an improved dialing apparatus consisting of circuitry for detecting the status of the telephone line 20. In particular, the stand-alone telephone dialing device of the present invention includes, in addition to a DTMF transmitter component 50, dial tone and busy tone detection circuitry 55 for detecting the status of the telephone line 20. In particular and as shown in FIG. 7, any time that a number or number sequence that has been stored in the telephone dialing device of the present invention is to be dialed, the DTMF transmitter 50 or equivalent circuitry "flashes" the telephone line 20 (i.e., controller issues an instruction to create a condition on the telephone line 20 to simulate the condition of the telephone 10 going "off-hook") and then causes a delay, as shown in step 100. After the delay, the telephone dialing device determines at step 101 whether a dial tone has been detected or whether instead a busy signal is detected or no signal is detected. If no signal is detected, the telephone dialing device may wait for a further predetermined period to wait for a dial tone or may instead re-initiate the calling sequence by "flashing" the telephone line 20 again (step 100). Likewise, if a busy signal is detected at step 101, the device of the present invention can immediately reinitiate the dialing sequence at step 100. The sequence of steps of attempting to obtain a dial tone by reinitiating the calling sequence if no dial tone is detected or if a busy signal is detected can be repeated any number of times, and can be limited to a predetermined number of attempts, such as shown in step 102. If, for example, no dial tone is detected within three dialing sequence attempts as shown at step 102, the dialing device can simply end the call (step 103). In providing an improved dial tone detection circuit for the stand-alone dialing device of the present invention, and by specifically including circuitry for detecting the presence of a busy signal on the telephone line 20, the present invention provides an improved method and apparatus for dialing telephone number sequences, as compared to any system which uses only a timer mechanism to reinitiate a dialing sequence, insofar as such a simple timer-based approach will require the user of the telephone to listen to a busy signal through the entirety of the timer period, whereas the present invention provides for immediate reinitiation of the dialing sequence upon detection of a busy signal.

In the first step of the alternate embodiment depicted in FIG. 3A, the stand-alone telephone dialing device adapted to be inserted between the telephone 10 and the telephone access line 20 of the present invention determines whether the telephone 10 has been taken off hook in step 60. When the telephone 10 is taken "off-hook," the circuits of the stand-alone telephone dialing device of the present invention are initialized in step 61.

Upon initialization, the dialing device determines whether it has been configured for "home" or "away" operation at step 110. As will be explained in greater detail below, the "home" mode of operation enables the telephone dialing device of the present invention to provide a first set of functionalities, while the "away" mode of operation allows the telephone dialing device of the present invention to provide a second set of functionalities. Such functionalities include, for example, modes of operation that would be useful for an operator using a telephone system in a hotel. As will also be explained in further detail below, the telephone dialing device of the present invention can be set in either the "home" or "away" mode by any of a number of different techniques, including providing a two-position switch on the external housing of the telephone dialing device of the present invention. Alternately, the telephone dialing device of the present invention can be internally configured to operate in either mode without providing an option to the user of controlling the mode of operation, such as by way of "hard wiring" or coding for the device. Such an arrangement could be used in situations where a manufacturer of a telephone dialing device of the present invention wishes to separately market two types of products, one for use at home and one for use away from home.

Continuing with the description of the embodiment of the present invention shown in FIG. 3A, upon determining that the telephone dialing device has been set to the "home" mode in step 110, the dialing sequence entered by the user in telephone 10 is detected, decoded and stored in step 62 by the DTMF receiver/decoder 30 and microprocessor 40. As will be appreciated by those skilled in the art, the decoded numbers can be stored in any of a variety of memory storage systems 45, including random access memory, temporary holding registers, buffers or other memory storage elements.

At step 62, the dialed number sequence is transmitted to the telephone line 20, and is also internally stored within the stand-alone telephone dialing device of the present invention in order to first determine what type of telephone number dialing sequence has been entered based upon the initial number or numbers in the dialing sequence. Alternatively, the dialed number sequence is buffered and prevented from reaching the telephone access line. In particular, if the first number of the telephone dialing sequence is determined to be a "1" or if the first three numbers of the telephone number dialing sequence are determined to be "011," the telephone dialing device of the present invention proceeds through the steps shown in FIG. 4. If the first number in the telephone dialing sequence is determined to be an "*" in step 70, the telephone number dialing device of the present invention proceeds through the steps depicted in FIG. 5. If none of the determinations set forth above (or any subset of these determinations) are made, then the dialing device of the present invention will dial the numbers stored in memory (or "refrain" from interrupting the current call, depending on how the initial dialing is handled).

Upon determining that the first number of the stored telephone dialing sequence is a "1" in step 63 or upon determining that the first three numbers of the telephone number dialing sequence are "011" in step 67, the dialing device of the present invention "recognizes" that a toll number has been dialed and proceeds through the steps shown in FIG. 4 to generate a dialing sequence as described below. Under established telephone number dialing protocols, any number beginning with a "1" will be a long distance type of toll call (such as a long distance call to another area code) or a charge-type of toll call (such as a 1-800 or 1-888 call which is charged to the recipient or a 1-900 call which is charged to the caller). One notable exception to the foregoing occurs in certain parts of the country, such as largest metropolitan areas, where "local area codes" are not charged as toll numbers. Other than the foregoing telephone number dialing sequences, any telephone number dialing sequence beginning with a "1" will be a toll-bearing long distance call under the North American dialing plan that will be billed to the user by the carrier company that handles the long distance call. Similarly, any telephone number dialing sequence beginning with the digits "011" will also be a toll-bearing international phone call which is also billed by the carrier company who handles the international call. Because one of the advantages of the present invention is to selectively route long distance and international toll-bearing calls through specified carriers, the telephone dialing device must selectively identify those types of toll-bearing calls that are charged to a long distance carrier.

Figure 4:
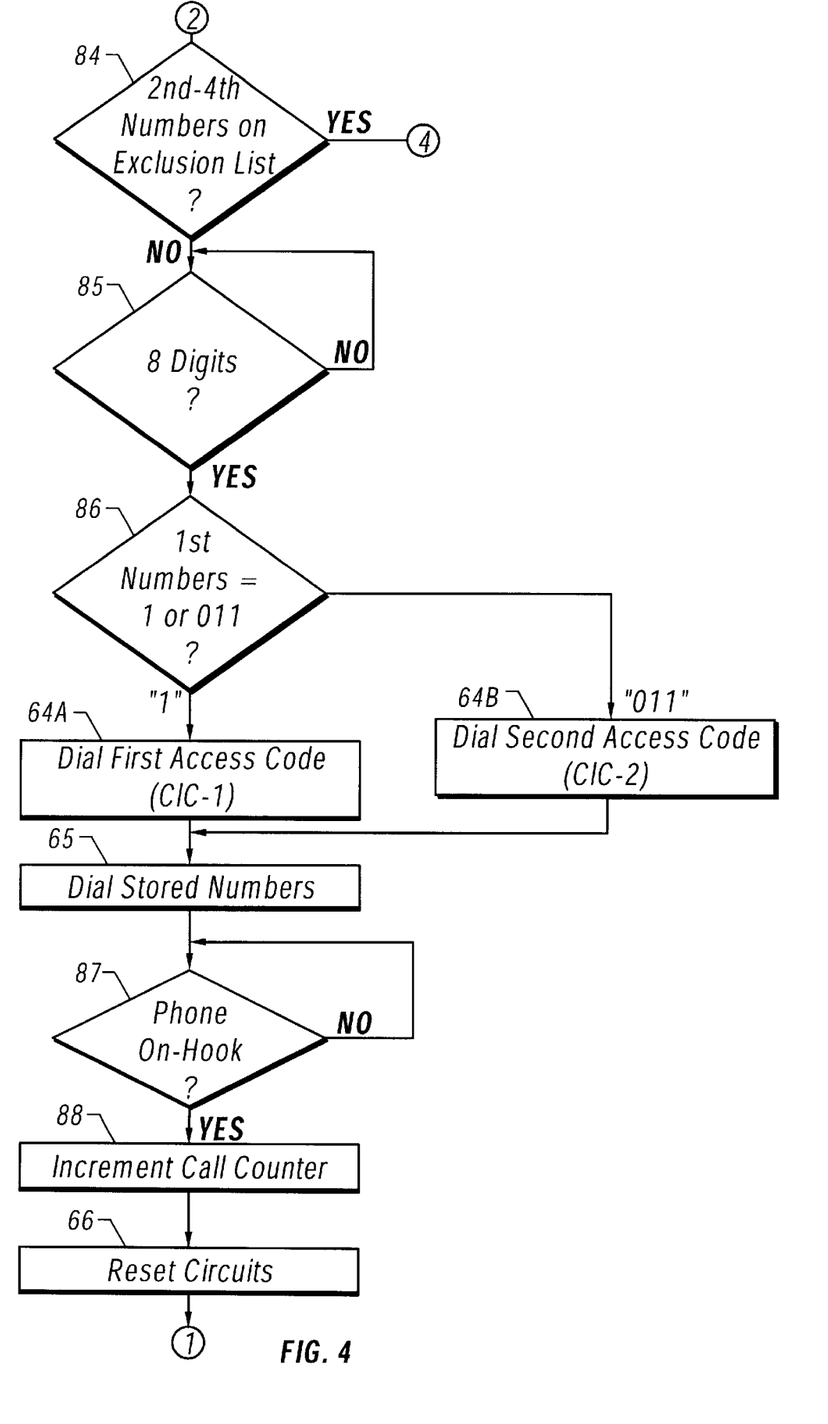
Figure 6:
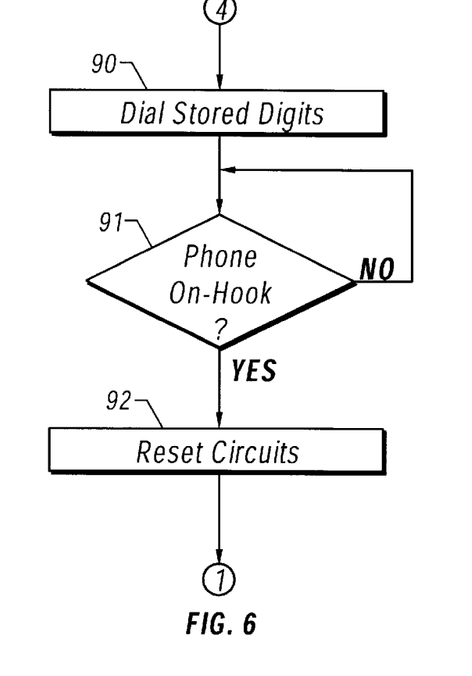

In accordance with one embodiment of the present invention shown in FIG. 4, the toll-bearing calls beginning with a "1" are identified by the telephone dialing device by first determining whether the second, third and fourth numbers of the dialed telephone number sequence are on an exclusion list at step 84. In particular, the microprocessor 40 executes a series of comparisons of the second through fourth numbers with the numbers stored on an exclusion list in the memory 45 which would include the toll-free number sequences (800, 888), the charge call sequences (700, 900) or any local area code numbers that apply for the user. In addition, the dialing telephone number sequence can be analyzed to determine if it begins with a "10" or a "*" by using the exclusion list. If the second through fourth numbers of the dialing sequence match any of the numbers on the exclusion list (or if the number sequence begins with a "10" or "*"), then the microprocessor 40 would cause the DTMF transmitter 50 to dial the stored digits, or would simply let the originally dialed call proceed if it was dialed out to the access line in the first place. Upon completion of the call when the phone is placed on hook (step 91), the circuits for the dialing device would be reset (step 92), all as shown in FIG. 6. As described previously, the dialing device of the present invention provides an improved apparatus and method for dialing the stored numbers at step 90 in accordance with the steps shown in FIG. 7, or may instead use conventional dialing.

Referring back to FIG. 4, if the second through fourth numbers of the telephone number dialing sequence are not on the exclusion list as determined at step 84, the dialing device will wait until at least 8 digits have been entered (step 85) until determining at step 86 whether the leading code for the telephone number dialing sequence is a "1" or "011." If the first code is a "1," the dialing device retrieves and dials a first carrier identification code ("CIC") (CIC-1) from memory which is reserved for long distance calls within the North American dialing plan at step 64A. If, however, the leading code numbers for the telephone dialing sequence are "011," the dialing device retrieves a second CIC code (CIC-2) from memory and causes the DTMF transmitter to dial the second CIC code. By providing separate CIC codes for long distance and international phone calls, the present invention allows different carriers to be used for long distance calls and international calls. For example, one carrier may provide better rates for long distance calls, but may not have good rates for international calls, in which case a second carrier having better international call rates could be used. Once the CIC code has been dialed at step 64, the stored digits are dialed by the DTMF transmitter 50 at step 65, thereby forming a first dialing sequence.

Upon conclusion of the call (step 87), a call counter on the dialing device is incremented at step 88. As will be explained in more detail below, the content of the call counter indicates how many toll-type calls have been made and enables the dialing device of the present invention to initiate a registration procedure or to provide periodic reports to the long distance carrier. As will be appreciated, the counter can include not only information about how many calls have been made, but may also include information about the date of each call, the number that was called, the duration of each call, etc., all under control of the microprocessor 40.

In accordance with an alternate embodiment of the present invention, information in addition to or in place of the CIC code can be retrieved from memory at step 64. For example, the present invention can be used to provide "free" domestic long distance or international phone calls by retrieving from memory at step 64B a phone number for an Internet access service provider along with any necessary authorization or code information (such as user login or password codes). In this way, when the dialing device of the present invention detects at step 86 that an international telephone number dialing sequence has been entered, the telephone number for an Internet access service provider is retrieved and dialed at step 64B, along with any required authorization or access information required for obtaining access to an Internet-based international phone call. After the appropriate information has been dialed, the stored telephone number dialing sequence is dialed at step 65, and the remainder of the call is handled as described above. In this way, the present invention recognizes that an international phone call is being placed, and automatically converts the call to an Internet-based call by automatically dialing the local service provider or other Internet service provider, entering the information needed to initiate an Internet-based long distance or international call and then dialing the destination number. In addition, alternative access code information can be dialed out upon determining that a long distance or international call has been placed, such as a toll-free "1-800-XXX-XXXX" number for providing an alternate carrier route for calls dialed to that number.

In particular, as an improved feature of the CIC code dialing step 64, a further embodiment of the present invention provides for automated access to an alternate carrier through a specified toll-free number (i.e., a "1800" or "1888" number) instead of relying upon the use of a unique CIC code that must be implemented nationwide. In particular, if the dialing device of the present invention is programmed to store an access code consisting of a toll-free "1-800-XXX-XXXX" number, the dialing device will dial the toll free number as the matching access code to thereby reach an alternate long distance carrier that has previously been set up for numbers dialed through the toll-free number. To reduce memory requirements for the access code, the dialing device may be programmed to respond to an access code having a predetermined symbol (such as the "*" sign) at the beginning of the access code to automatically dial "1800" in response to the predetermined symbol from the string. For example, if the dialing device recognizes at step 86 that the telephone number routing code is a "1," and recognizes further that the access code sequence stored in the dialing device begins with an "*" sign, then the device would automatically dial "1800" plus the remainder of the access code plus the dialed telephone number at steps 64A and 65. Likewise, upon determining at step 86 that an international phone call had been dialed beginning with the sequence "011" and recognized that the stored access code corresponding to international calls included an "*" symbol at the beginning of the access code string, then the device would be programmed to automatically dial "1800" in place of the "*" symbol plus the remainder of the access code at step 64B. A particular advantage of this feature of the present invention is that specific long distance carrier services can be quickly and efficiently set up by using a "1800" number, rather than requiring implementation of a dedicated CIC code nationwide.

Figure 5:
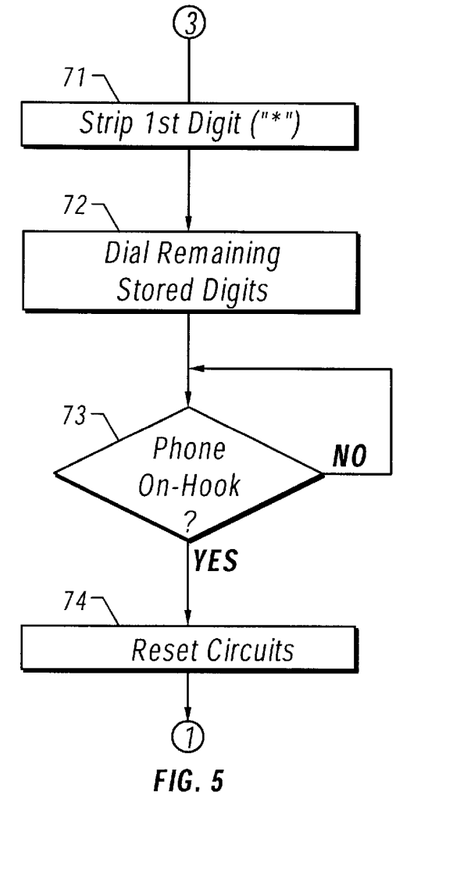

The telephone dialing device of the present invention may optionally provide a way to override the telephone number routing function so that any toll-bearing calls are instead handled in accordance with the default or primary long distance carrier setting provided by the local telephone service provider. In accordance with an exemplary embodiment of the invention, the user overrides the call routing function of the telephone dialing device by entering a predetermined sequence prior to entry of the telephone number dialing sequence to be dialed. For example, the dialing device may be configured to "recognize" that entry of the "*" key, followed by a telephone number dialing sequence, is an instruction by the user to override the telephone number routing function of the dialing device and to instead use the default long distance carrier. Upon detection that the first number of the telephone number dialing sequence is an "*" at step 70, the telephone dialing device of the present invention removes the first digit (the "*") from the telephone number dialing sequence at step 71 and then dials the remaining stored digits at step 72, all as shown in FIG. 5. Again, the dialing of the stored telephone number sequence can be accomplished with the DTMF transmitter in accordance with conventional practices or in accordance with the steps shown in FIG. 7.

Referring again to FIGS. 3A and 3B, if the telephone dialing device determines that there are no toll-bearing calls being entered by the user at steps 63, 70 and 67, the stored dialing sequence is dialed (or allowed to proceed) at step 68, and upon conclusion of the phone call (step 80), the circuitry is reset and the device returns to its initial state (step 69).

While the present invention contemplates, in general, determining the specific type of call being placed before routing the call along the appropriate carrier path, it will be appreciated by those skilled in the art that the sequence of steps can be consolidated or reorganized without departing from the scope of the present invention. For example, the telephone dialing device could preliminarily decide whether the telephone number dialing sequence was a "valid" sequence (i.e., one that begins with a "1" or a "011" sequence) by first routing any excluded numbers (i.e., numbers beginning with "10" or "1700" or "1800" or "1900" or "1888" or numbers on a list of local area codes or numbers not beginning with "1," "011" or "*") outside of the system of the present invention for dialing under the default carrier code. By so screening the invalid calls, the sequence of steps following decision steps 63 and 67 would be significantly shortened and could consist only of steps 86, 64 and 65.

Because of the significant expense of telephone calls charged by hotels, it would be advantageous to bypass these substantial charges by taking advantage of the long distance carrier routing capabilities of the present invention. Accordingly, an alternate embodiment of the present invention provides an "away" mode for the dialing device to provide specialized dialing functionality, such as special dialing features for use in telephone systems such as are typically found in hotels. The telephone dialing device of the present invention can be configured to operate in an "away" mode by use of a user-actuated switch on the external housing of the dialing device, or by use of internal programming or switching functions provided by the manufacturer of the device. In general, the "away" mode configuration of the dialing device of the present invention takes advantage of the user's ability to avoid the hotel call charges by dialing a "1800" sequence as the access code from the hotel room, and thereby incur charges only under the charging scheme of the carrier identified by the particular 1800 access code.

In accordance with a selected embodiment of the present invention, upon detecting that the dialing device is in the "away" mode at step 110, the telephone number dialing sequence entered by the user is decoded and stored at step 111 and the decoded numbers can be analyzed to determine if a "valid" number was dialed, as described above. A dialing device configured in the "away" mode can be configured to provide access to a specified business service without incurring hotel telephone call expenses by entering a first predetermined sequence of numbers as the dialing sequence. Business service options that would be accessible by the dialing device of the present invention could include speed dialing, conference calling, facsimile mailing or voice mail. For example, if the dialing device recognizes that the first three numbers of the dialing sequence match a stored predetermined sequence (i.e., "8" or "9") at steps 115 and 118, the dialing device will cause the DTMF transmitter 50 to dial whatever initial number is required to obtain an outside line, followed by the "1800" number stored in the third access code (CIC-3) at step 113. Because hotel telephone networks typically require the user to dial either an "8" or "9" to obtain an outside line, the dialing device of the present invention can be preconfigured to insert one or the other of these numbers into the dialing sequence of step 113. Alternatively and in a preferred embodiment of the present invention, when the user dials out the telephone dialing sequence (including the required "8" or "9"), the dialing device keeps track of the initial number and uses the same number in the sequence as an external line digit at step 113. Upon establishing a connection to the outside line over the specified long distance carrier (identified with the toll free number of the third access code), the user can utilize the accessed business service, such as, for example, entering into a menu of options for a voice message system (step 114) after entering an authorization code or similar such identification of the user.

In accordance with an alternate embodiment of the "away" mode of the telephone dialing device of the present invention, the dialing device provides the user with the ability to make long distance phone calls under the charge scheme of the long distance carrier specified by the access code, thereby avoiding the hotel's call charges. In particular, upon recognizing that a "8" (or "9") has been dialed at step 115, the dialing device flashes the line, dials an external line digit (the "8" or "9") and delays for a predetermined amount of time in order to detect a dial tone at step 117. Upon detection of a dial tone and after the predetermined delay, the dialing device determines whether the next number of the dialing sequence is a "" at step 118, which would be entered in order to enter the business services option described above for the dialing device. If there is no "" detected, the dialing device dials the "1800" number from a fourth access code (CIC-4) as shown at step 119 in order to route the call through the carrier identified by the fourth access code, and then obtains a dial tone. In addition, additional access codes may be retrieved and dialed upon detecting a predetermined sequence in the dialing sequence. For example, if the dialing sequence includes the international dialing prefix, "011," a fifth access code is used at step 119, whereas the fourth access code is used for dialed numbers beginning with a "1."

Upon completion of step 119 or upon determination that the second and a third digit of the dialing sequence were "" at step 118, the dialing device dials the "authorization code" stored in the dialing device and the telephone number code" (step 120) or dials only the authorization code only (step 114) if, for example, only the authorization code is needed to access a platform for providing business services. As described above, upon completion of the call using one of the stored access codes at step 121, the call counter is incremented at step 122 to indicate that another toll-bearing call has been placed, and the circuits of the dialing device are reset at step 123**.

The foregoing description of the "away" mode for the dialing device of the present invention has been described only in terms of some additional, exemplary features that can be added to the dialing device of the present invention. It will be appreciated that various aspects of the "home" mode of the dialing device of the present invention can be incorporated into the "away" mode of the device. For example, the improved dialing sequence described above and shown in FIG. 7 may optionally be used at any time that a number is to be dialed out over a line. In addition, "invalid" numbers may be screened from the system by checking the entered dialing sequence against a table of excluded area code numbers or dialing sequences.

In accordance with an alternate embodiment of the present invention, the telephone number dialing device is provided with a "self-registration" mode whereby the telephone dialing device is configured to register with the long distance carrier or other specified entity (the Control Center) and/or to provide regular or intermittent reports concerning the status of the device. In particular, it is beneficial for many reasons that the owner of a telephone dialing device such as described herein register with the long distance carrier in order to identify who the carrier's "customers" are. Such an identification is important for purposes of billing the customer for their long distance or toll-bearing calls. Because traditional techniques for obtaining customer registration are by no means uniformly effective a self-registration function is needed to provide for consistent registration of the telephone dialing devices. In particular, the present invention provides for an automated registration call to be placed by the telephone dialing device in order to provide information about the customer that has purchased and is using the device.

In accordance with a selected embodiment of the present invention, the dialing device maintains a call counter under the control of the microprocessor 40 which contains therein a count of the number of long distance calls that have been placed with a particular access code (i.e., with a particular long distance carrier). Every time that a toll-bearing call is made with a particular CIC code, a counter associated with that code is incremented by one. When the call counter is greater or equal to a call back value set within the telephone dialing device, the dialing device enters into a registration mode after the user hangs up the handset. In addition, the device may be programmed to enter a "forced registration mode" upon detection of a specified dialing sequence (i.e., "##**").

In the registration mode, the telephone dialing device initiates a call to the long distance carrier or other specified entity (the Control Center) at a predetermined time so that the carrier can obtain selected information about the customer that purchased the device and so that the carrier may optionally exchange additional registration information with the device and/or remotely program the device. At the conclusion of the registration process, the call counter is reset so that a predetermined number of calls will be made before the next registration call or report is made by the telephone dialing device.

FIG. 8 is described with reference to an example of the registration mode for the telephone dialing device of the present invention. In particular, the microprocessor 40 continually monitors the values for the call counter register and call back register at step 200. Upon determining that the call counter value equals or exceeds the call back count, the dialing device calls the long distance carrier of interest by dialing the stored "Registration Number." As will be appreciated, because the present invention provides for storage of multiple CIC or access codes, a call counter register and call back value can be maintained separately for each of the stored codes, and the registration process described below can be separately implemented for each long distance carrier having a CIC code stored in the dialing device.

When the value stored in the call counter register equals or exceeds the value stored in the call back register, the dialing device calls the Control Center by first going "off-hook" for a predetermined amount of time, reconnecting to the telephone line 20 and then dialing out through the DTMF transmitter a dialing sequence consisting of a toll free "Registration Number" that is stored in the memory of the device. Upon establishing a connection with the Control Center, a series of commands are exchanged between the dialing device and the carrier in order to provide information about the particular device that is being registered and the customer that has purchased the device. For example, after dialing the registration number, the telephone dialing device will look for a response signal from the Control Center to indicate that registration mode has been initiated. Upon receiving a response from the Control Center, the dialing device transmits a predetermined instruction sequence along with the serial number information stored on the device. By transmitting the particular device's serial number information, the Control Center can keep track of the sales of particular devices. In addition, upon dialing into the Control Center, the Control Center can automatically obtain information about the customer that has purchased the device by using the automatic number identification ("ANI") to identify the customer, its area code and any local call area codes associated with the customer's area code which may usefully be remotely programmed into the device's exclusion list as described below.

Upon completion of the device registration step 210, the device may optionally enter into a programming mode whereby the Control Center provides programming instructions to the telephone dialing device. The programming mode can be used to reconfigure any of the information stored within the memory of the dialing device, such as resetting the call back counter value, changing any of the CIC or access codes, changing the registration number or password or changing the number on the exclusion list, all as will be described in greater detail below. At the conclusion of the registration process, the call counter register is reset to zero at step 220, or is reset to some other value in order to control the frequency of the registration procedure.

In accordance with a selected example of the remote programming embodiment of the present invention, the telephone dialing device exchanges a series of instructions in order to correctly enter changes to the programmable data of the device. For example, before the telephone dialing device will enter into the programming mode, the device must receive a predetermined programming instruction and a password from the long distance carrier. The device confirms that the received password matches with the password that is stored on the device. The dialing device will provide a response indicating that it is in programming mode and will await the first programming instruction from the long distance carrier. If no instruction is received within a predetermined amount of time, the dialing device will hang up and exit from the programming mode.

According to an alternate embodiment, the telephone dialing device of the present invention may be remotely programmed to change or correct any of the stored CIC access codes, or to reprogram any other features stored in the memory of the dialing device. For example, the dialing device of the present invention may be provided with an electrically erasable programmable read-only memory ("EEPROM") for storing information relating to the operation of the device, such as a listing of the excluded telephone numbers (i.e., numbers that, if dialed, the device will ignore and not treat as a long distance or international dialing number), an initial value for the call counter register, a maximum value for the call back register, a serial number for the device, a registration phone number that the device would use in its self-registration mode, an authorization code for billing purposes, any of a number of CIC codes and/or a password for controlling access to the programmability feature of the device.

The programming mode may be initiated by the control center of a long distance carrier or other entity by calling the user of the telephone dialing device, and after the user picks up the handset, transmitting a digital password to the device. The dialing device is configured to receive and recognize this password by comparing it to the password stored in its EEPROM memory. Upon receipt of a password from the control center, the telephone dialing device will check the password against the EEPROM contents, and if the EEPROM check sum is good, the telephone dialing device will provide a first affirmative response to the control center, but if the EEPROM check sum is incorrect, the telephone dialing device will provide a second negative response to the control center. If the check sum is incorrect, then the control center will program all items from the EEPROM memory in the telephone dialing device in order to confirm correct operation of the device.

If the correct password has been transmitted and recognized, the device will take control of the telephone line to prevent the line from going into the "off-hook" mode. During this time, the telephone dialing device may provide a response to the control center indicating that the password has been successfully received or that a correct password has not been received. Upon successful detection of a password, the telephone dialing device will wait for a first programming instruction from the control center for a predetermined amount of time, after which it will hang up and exit the programming mode.

As indicated above, each of the items stored in the memory may be reprogrammed. For example, each of the CIC codes may be separately programmed to change the identity of an inter-exchange carrier. Such a change may be required if, for example, the user of the dialing device is transferred from the account of one wholesale reseller to another reseller. In this situation, it will be advantageous to the second reseller to enter its own password for controlling the programming of the device so that the original wholesale reseller can no longer control the programming of the device. In one example, a transfer of a set of users of devices of the present invention from one account to another could use an intermediate password whereby each of the devices would be programmed to use an intermediate password, and then the purchaser of the accounts for these devices could then use the intermediate password to reprogram the devices a second time to use the password for the purchaser.

The programmability of the registration number for the device would also be useful in situations where the account for a particular device is transferred from one wholesaler to another, so that the purchasing wholesaler could program the device with a new registration number so that the device would call into the purchaser as identified by the new registration number.

The programmability of the initial call counter value and maximum call counter value will be useful for controlling the occasion and frequency of the device entering into the self-registration mode. For example, the device as originally sold could be programmed to have the initial call counter value programmed to be greater than the maximum call counter value, in which case the device would immediately enter into self-registration mode as soon as the device was installed. Alternately, the device could be remotely programmed to change the call counter value so as to control the frequency with which self-registration occurs. For example, if it is desired to obtain monthly self-registration reports from each user, the use of a particular telephone dialing device could be monitored to determine the volume and frequency of telephone calls, and the call counter values can be adjusted so that the device will provide approximately monthly self-registration reports.

The numbers on the "exclusion list" that are stored in the memory may also be reprogrammed so that the toll-free numbers can be added or removed, and so that any local area code numbers can be added for a particular user once its location is determined through the self-registration process. For example, upon determining the telephone and area code numbers for a particular user during the self-registration mode, the long distance carrier could quickly determine which area codes are to be treated as local area codes, and these local area code numbers could then be programmed into the exclusion list during the self-registration process or at a later time by remotely programming the device.

Each step used in remotely programming the telephone dialing device can be acknowledged with a predetermined first response upon successful completion of any programming step, and with a second predetermined response if a programming step is not correctly implemented. Upon completion of the remote programming of the device, the control center will provide a sign off indication, to which the telephone dialing device may respond.

Various modifications will become possible for those skilled in the art after having the benefit of the present disclosure without departing from the scope thereof, and the invention is meant to include such modifications as recited in the following claims.

What is claimed is:

1. A telephone dialing device adapted for insertion and operation between a telephone and a telephone access line for selectively routing a dialed telephone number comprising:

(a) a first connector for connection to the telephone;
(b) a receiver connected to the first connector for intercepting and decoding a dialed telephone number having a plurality of digits;
(c) a memory for storing at least one access code and at least one preselected sequence;
(d) a controller connected to the receiver and the memory for comparing at least one of the digits of said intercepted number to at least one preselected sequence and for generating a first dialing sequence to route the dialed telephone number through a first alternate carrier if said compared digits are in agreement with the first preselected sequence and for dialing the telephone number if the compared digits are not in agreement, wherein the first dialing sequence comprises an access code corresponding to a first preselected sequence for specifying the first alternate carrier; and
(e) a DTMF transmitter coupled to the controller for transmitting a specified dialing sequence and a tone detect circuit coupled to the controller for detecting the status of the telephone access line, such that the specified dialing sequence is transmitted to the telephone access line by flashing the telephone access line and re-transmitting the specified dialing sequence upon detecting a busy signal on the telephone access line.

2. The telephone dialing device of claim 1 wherein the first dialing sequence comprises a first access code for a first inter-exchange carrier followed by the dialed telephone number if the first digit of said dialed number is a "1" and comprises a second access code for a second inter-exchange carrier followed by the dialed telephone number if the first three digits of said dialed number are "011."

3. The telephone dialing device of claim 1 wherein the access code comprises a toll-free dialing sequence.

4. The telephone dialing device of claim 3 wherein the first dialing sequence comprises an external line digit inserted before the access code and further comprises an authorization code inserted after the access code.

5. The telephone dialing device of claim 4 wherein the first dialing sequence further comprises the dialed number inserted after the authorization code.

6. The telephone dialing device of claim 1 wherein the access code comprises a telephone number for an internet access service provider.

7. The telephone dialing device of claim 1 wherein the access code comprises a CIC code for specifying a first alternate carrier.

8. The telephone dialing device of claim 1 wherein the access codes are remotely programmable.

9. The telephone dialing device of claim 1 wherein a list of excluded dialing sequences is stored in the memory and wherein the controller compares at least one of the digits of the intercepted number to the excluded dialing sequences and generates a dialing sequence consisting only of the digits contained in the dialed telephone number if said compared digits are in agreement with the excluded dialing sequences.

10. The telephone dialing device of claim 9 wherein the list of excluded dialing sequences are remotely programmable.

11. The telephone dialing device of claim 1 further comprising a decoder connected to the telephone access line, wherein the memory further comprises a remotely programmable password, and wherein the controller reprograms data stored in the memory when the decoder receives a data sequence from the telephone access line that corresponds to the password stored in memory.

12. The telephone dialing device of claim 1 further comprising a switch for selecting between a first mode and a second mode, wherein the controller generates the first dialing sequence comprised of a first access code and the dialed telephone number if the device is configured in the first mode, and generates a second dialing sequence comprised of an external line digit and a toll free dialing sequence access code if the device is configured in the second mode.

13. A telephone dialing device adapted for insertion and operation between a telephone and a telephone access line for selectively routing a dialed telephone number comprising:

(a) a first connector for connection to the telephone;

(b) a receiver connected to the first connector for intercepting and decoding a dialed telephone number having a plurality of digits;

(c) a memory for storing at least one access code and at least one preselected sequence;

(d) a controller connected to the receiver and the memory for comparing at least one of the digits of said intercepted number to at least one preselected sequence and for generating a first dialing sequence to route the telephone number through a first alternate carrier if said compared digits are in agreement with the first preselected sequence and for dialing the telephone number if the compared digits are not in agreement, wherein the first dialing sequence comprises an access code corresponding to a first preselected sequence for specifying the first alternate carrier; and (e) said memory further comprises a call back value, a call count value and a registration number, and wherein the controller increments the call count value each time a dialing sequence is generated and executes a self-registration call whenever the call count value equals or exceeds the call back value by issuing a flashing instruction for the telephone access line and generating a dialing sequence consisting only of the registration number.

\* \* \* \* \*